United States Patent [19]

Poyner

[11] Patent Number: 4,704,202
[45] Date of Patent: Nov. 3, 1987

[54] WATER FILTERING SYSTEM

[75] Inventor: Arthur F. Poyner, Tolleson, Ariz.

[73] Assignee: Victor Marquez, Tolleson, Ariz.

[21] Appl. No.: 766,490

[22] Filed: Aug. 19, 1985

[51] Int. Cl.⁴ .............................................. B01D 27/12
[52] U.S. Cl. .................................... 210/108; 210/138;
210/169; 210/333.01; 210/333.1; 210/416.2;
210/425; 210/427
[58] Field of Search ............... 210/138, 139, 140, 169,
210/108, 167, 333.01, 416.2, 333.1, 424, 425,
426, 427, 421, 420, 419, 418

[56] References Cited

U.S. PATENT DOCUMENTS 2,057,257 10/1936 Walker .................................. 210/421
4,153,552 5/1979 Muther .................................. 210/427

*Primary Examiner*—Frank Sever
*Attorney, Agent, or Firm*—Herbert E. Haynes, Jr.

[57] ABSTRACT

A water filtering system for connection to at least one water supply to be filtered including a filter tank containing cartridge-type filter media with the tank being especially configured to provide an evenly distributed water flow through the filter media for efficient water filtration. The system further includes a special plumbing system and controls therefore for establishing a two stage filter cleaning operation wherein water is impingingly directed onto the filter media for flushing of the filter media and the filter tank in the first stage of the filter cleaning operation and water is directed through the filter media in a backwash direction in the second stage of the filter cleaning operation. The controls may be automatic for switching the system from water filtering operation to filter cleaning operation at pre-determined time intervals, or whenever the filter media becomes dirty, and for switching back and forth between the two stages of the filter cleaning operation whenever the system is in the filter cleaning operation.

24 Claims, 6 Drawing Figures

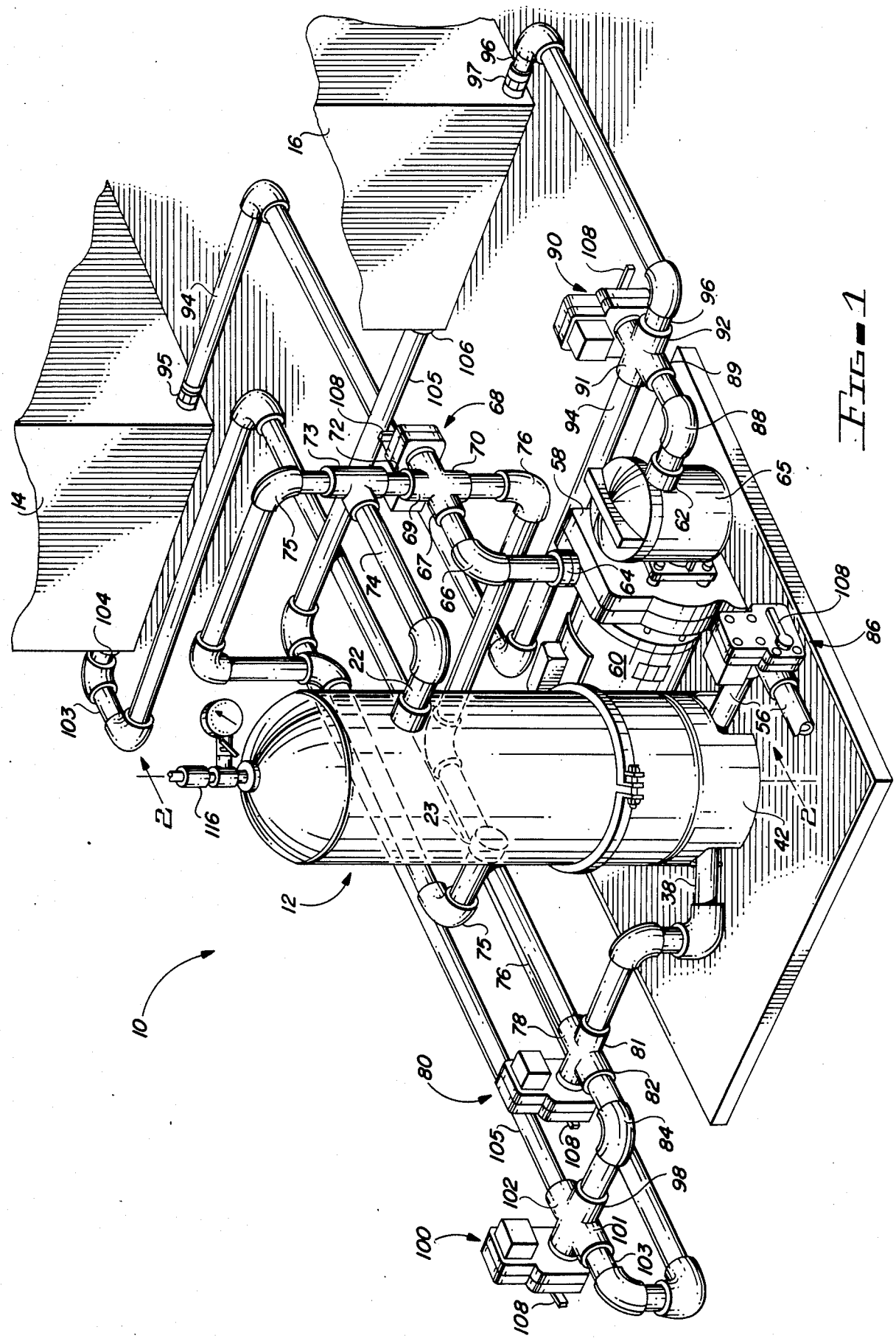

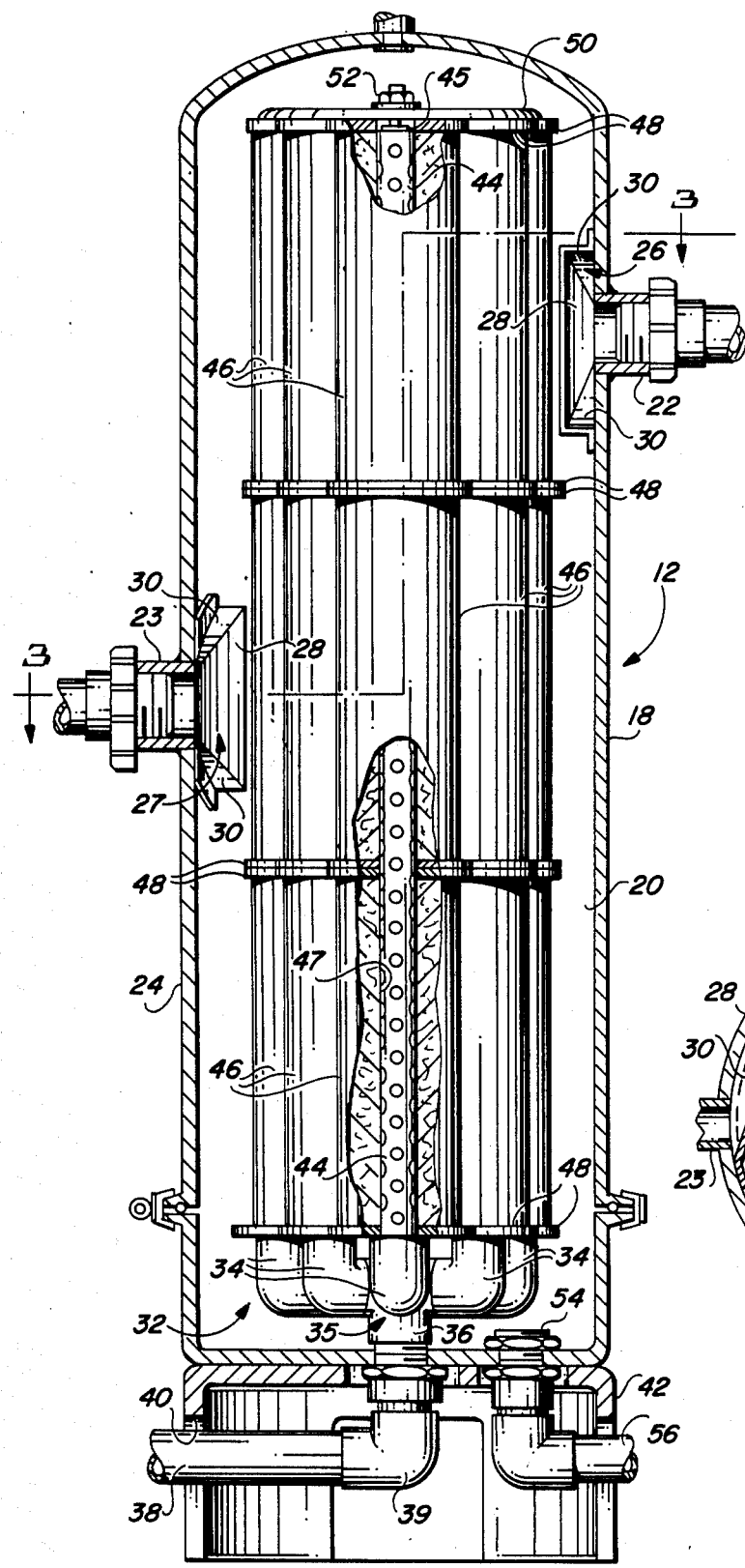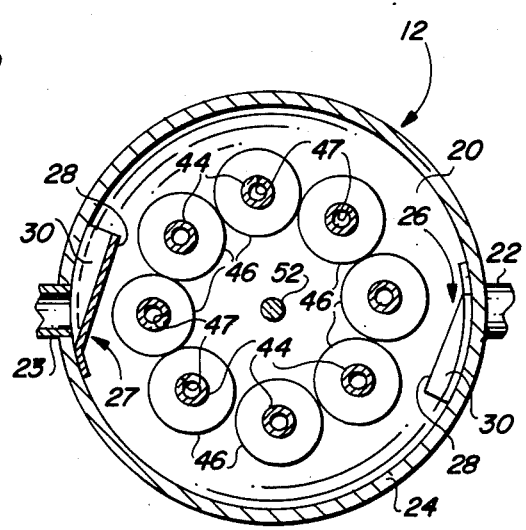

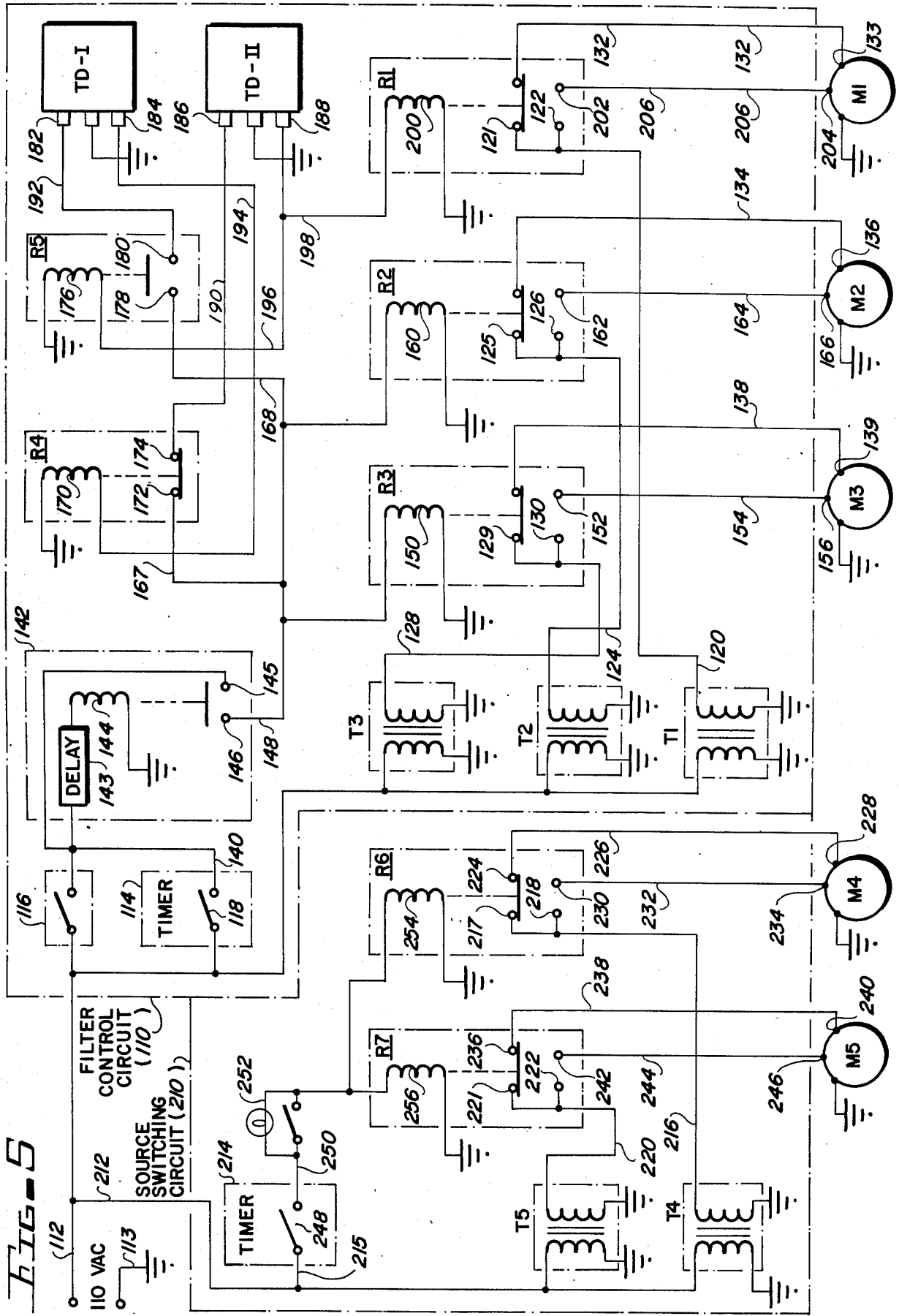

WATER FILTERING SYSTEM

BACKGROUND OF THE INVENTION

1. Field of the Invention

This invention relates in general to water filtering systems and more particularly to a filtering system for use in filtering water supplies having a high rate of contamination, such as the water supply used in water cooled air conditioning systems.

2. Description of the Prior Art

With the significant increases in energy costs in the last several years, it has become essential that ways be found to reduce energy consumption and to reduce whatever other costs are associated with equipment operation in general and cooling systems in particular. As a result, significant improvements have been made in building insulation, air leakage and the like.

However, the primary focus for reducing operating costs in cooling systems must be related to the cooling systems themselves. Even if it is only possible to reduce operating costs by a small percentage, significant savings can be realized over a period of time.

Many air conditioning, or refrigeration, systems include what may be considered as a closed loop cooling system wherein a refrigerant is recirulatingly moved from a chiller to a load. When the refrigerant passes through the load, it picks up heat and carries it back to the chiller. The chiller includes a compressor and a condenser with the function of the condenser being to extract the heat from the refrigerant and dissipate that extracted heat. In most residential and other relatively small cooling systems, heat is extracted from the condenser by moving air across the condenser. However, in most commercial or industrial cooling system installations water is used to cool the consenser.

In the relatively large cooling systems such as the commercial or industrial installations mentioned above, the condenser is located in a cooling tower and water is recirculated through the tower in an open loop between spray nozzles located in the top of the cooling tower and a water collection sump located in the bottom of the tower. Thus, the condenser is cooled by evaporation of the water as it is sprayed down through the condenser.

As is well known, whenever evaporation takes place, the mineral concentration in the remaining water will increase and precipitation of the salt compounds results. The precipitated salts collect on the heat exchange surfaces of the condenser and form an insulative coating thereon which reduces the heat transfer capacity. In that a cooling tower is an open loop system, airborne contaminants also collect in the water such as dust, dirt, bacteria and the like. All of these contaminants cause fouling of the condenser and the cooling tower and can rapidly decrease the efficiency thereof. Due to cooling tower and condenser fouling, most cooling systems employ two cooling towers so that one can be used while the other is being cleaned. For example, in a rather dusty and arid area a typical cooling tower may need to be shut down for cleaning as often as once a week. This is, of course, very expensive from a labor standpoint and adds to the total operating costs of the cooling system.

In an attempt to help alleviate the condenser and cooling tower fouling problem, many cooling towers are provided with a bleed-off system which continuously extracts some of the contaminated water from the cooling tower and directs that waste water to a suitable disposal point. There are two problems with bleed-off systems. First, a bleed-off system, while being better than nothing, is not a very effective way of controlling fouling. And, secondly, a bleed-off system wastes a considerable amount of water and the water conditioning chemicals that are addedd thereto and adds significantly to the amount of make-up water that must be supplied to the cooling tower.

In many regions, water conservation is extremely important and cooling towers with bleed-off systems are falling into disfavor due to the large quantities of water and chemicals that are wasted by towers that are so equipped. In addition to the water and chemical conservation considerations, the costs of water must also be added to the total operating expense of the cooling systems.

In addition to the fouling of condensers and cooling towers, a build-up of solid particles in water circulation pipes will increase pipe friction and dynamic head losses, and the circulation of abrasive solids will increase wear on seals, pump parts and other system components.

In some instances, water filtration systems are employed and filtration will help reduce all of the undesirable factors that are inherent in cooling towers and other water bodies particularly those having a high rate of contamination.

The most common water filtering systems currently being used in some cooling towers are of the sand media filtration type. While such sand filters are a considerable improvement over the above described bleed-off systems, they have two shortcommings. First, sand filters are limited to their filtration effectiveness and are unable to remove suspended solids which are smaller than about 40–50 microns. Thus, many suspended solids which should ideally be removed from cooling tower water cannot be removed by a sand filter. Secondly, sand filters when used in cooling tower installations must be backwashed quite often and they waste considerable quantities of water and chemicals during a backwash cycle.

Therefore, a need exists for a new and improved water filtering system which overcomes some of the problems and shortcommings of the prior art.

SUMMARY OF THE INVENTION

In accordance with the present invention, a new and improved water filtering system is disclosed which is ideally suited for use in filtering the water used in the cooling towers of a chiller systems and in the filtration of other water bodies having a high rate of contamination. This improved filtering system is of the type sometimes referred to as a cartridge filtering system. Such systems are known for their filtering capabilities in that many suspended solids which can pass through a sand filter will be filtered out of the water passing through a cartridge filter. Cartridge type filtering systems are commonly used in swimming pool installations. But their use in the filtering water bodies having a high rate of contamination, such as chiller system cooling towers, has not been practical due to cartridge cleaning procedures.

In a conventional cartridge type filtering system, the cartridge or cartridges must be physically removed from the filter tank for cleaning. This lack of a backwashing, or other in situ cartridge cleaning capability makes conventional cartridge filtering systems unsuitable for use in cooling towers or other water bodies having a high rate of contamination. This will be appreciated upon consideration of the frequency of filter cleaning required in cooling towers. Of course the cleaning rate is determined by filter size and by several environmental factors such as the mineral content of fresh water in the region, airborne contaminants, evaporation rate and the like, but even under the best conditions, a filtering system may need to be cleaned several times in a 24 hour period.

In the improved cartridge type filtering system of the present invention, means are provided for improved filtration during the filtering operational mode and for accomplishing in an situ cartridge cleaning procedure during the cartridge cleaning operational mode. A special filter tank, plumbing and valve system arrangement cooperate to provide a special water flow pattern in the filter tank during the filtering operational mode wherein water flow through the cartridge media is evenly distributed across the entire filter surface area, e.g. the water flow is such that it prevents channalized water flow through the cartridge media. Those same system components cooperate to direct water flow through the filter tank in alternating directions during the filter cleaning operational modes. By periodically reversing water flow through the filter tank ridge filter media during filter cleaning, trapped contaminants on the cartridge filter media will be thoroughly and rapidly dislodged and flushed away with the dislodging and flushing being aided by flexing movements of the cartridge filter media during flow reversing. This special filter cleaning procedure thoroughly cleans the filtering media in a very short time and this results in minimized water usage during the filter cleaning operational mode.

The filtering system of the present invention can be configured for manual operation but is preferably configured for fully automatic operations wherein the filtering system is periodically cleaned at pre-determined time intervals or whenever the backpressure across the filter media exceeds a pre-determined value.

Extensive testing and evaluation of the cartridge filtering system has shown that a very high degree of water filtration is accomplished in comparison to the sand type filtering systems currently being used on some chiller system cooling towers. This improved water filtration reduces fouling of the chiller's condenser, the cooling tower and the water circulation system and thereby maintains cooling tower efficiency which reduces energy consumption, reduces down time for system cleaning and prolongs the useful life of the equipment. In that the filtering system can be periodically cleaned with a minimized use of water, significant savings are realized with regard to water and chemical conservation.

Accordingly, it is an object of the present invention to provide a new and improved water filtering system.

Another object of the present invention is to provide a new and improved water filtering system for use in filtering various types of water bodies particularly those having high contamination rates such as the cooling tower of a chiller system.

Another object of the present invention is to provide a new and improved cartridge type water filtering system which has a special water flow pattern in the filtering operational mode for providing an evenly distributed water flow across the cartridge media filtering surface area.

Another object of the present invention is to provide a new and improved cartridge type water filtering system of the above described character which is configured to provide in situ cleaning of the cartridge filter media.

Another object of the present invention is to provide a new and improved cartridge type water filtering system of the above described character in which the cartridge filter media is cleaned by a special filter cleaning operational mode wherein the cleaning is accomplished by periodically reversing the water flow during the cleaning to thoroughly and rapidly dislodge and flush the contaminants away with a minimized use of water.

Still another object of the present invention is to provide a new and improved cartridge type water filtering system of the above described character wherein the system may be configured for manual operation or for fully automatic operation.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective view of the water filtering system of the present invention showing some of the various features thereof and showing connection thereof to a pair of water bodies.

FIG. 2 is an enlarged sectional view taken along the line 2—2 of FIG. 1

FIG. 3 is a sectional view taken along the line 3—3 of FIG. 2.

FIG. 5 is a schematic diagram showing the various electrical components of the system control circuit and an optional water source switching circuit.

DESCRIPTION OF THE PREFERRED EMBODIMENT

Figures 4, 6:
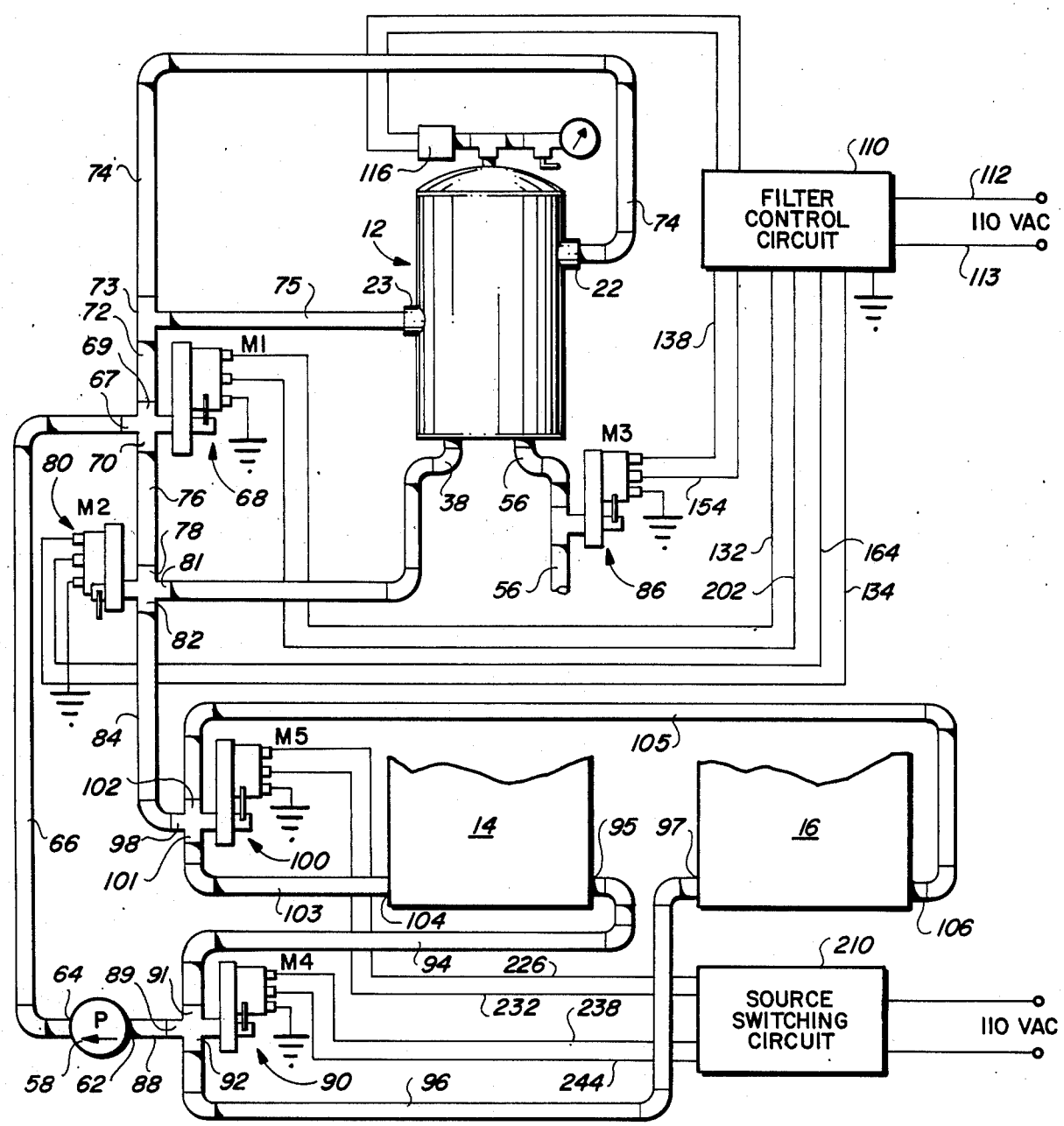
FIG. 4 is a schematic diagram showing the arrangement of control valves and other components of a plumbing system and connection thereof to a filter tank and showing the connection of the water filtering system to two water bodies.
FIG. 6 is a timing diagram which illustrates the timing sequence of the system control circuit.

Referring more particularly to the drawings, FIG. 1 shows the water filtering system of the present invention which is indicated generally by the reference numeral 10. As will hereinafter be described in detail, the system 10 is provided with an especially configured filter 12 which is coupled to a pair of cooling towers 14 and 16, or other bodies of water having a high rate of contamination, by a plumbing system having a plurality of flow control values therein.

As seen best in FIGS. 2 and 3, the filter 12 includes a tank 18 which is preferably of cylindrical configuration and defines an internal chamber 20. At least a pair of water inlet ports 22 and 23 are provided in diametrically opposed positions in the endless sidewall 24 of the tank with those inlet ports being axially spaced on the tank so that the inlet port 22 is above the other port 23 in the normally erect attitude of the filter tank 18. A pair of water deflector means 26 and 27 are mounted, such as by welding, on the inner surface of the tank's sidewall 24 with each deflector means being disposed proximate the innermost end of a different one of the inlet ports 22 and 23. As seen, each of the deflector means is in the form of a fan shaped plate 28 which lies along but diverges gradually away from the inner surface of the tank's sidewall. Incoming water will impinge on the fan shaped plates 28 of the deflector means and will be deflected through an outlet opening into a substantially circular flow path in the chamber 20 of the tank. In addition to the deflection, the fan shaped plates 28, by virtue of their fan shape and the integral side enclosing support walls 30 thereof, allows the incoming water to fan outwardly as it moves into the circular flow path in the filter tank 18.

A manifold means 32 is suitably mounted in the bottom end of the filter tank 18 with the manifold means including a plurality of branch pipe lines 34 which extend radially from a central hub means 35 from which a single internally threaded boss 36 depends. A suitable water flow pipe line 38 is coupled to the threaded boss 36 and has an elbow 39 therein so that the pipe line 38 extends radially from below the tank 18 through an opening 40 provided in the tank supporting base 42. Each of the branch pipe lines 34 has an upwardly extending perforated pipe 44 connected thereto with each of the perforated pipes being closed at its upper end such as by the nipple indicated at 45. Each of the perforated pipes 44 has a plurality of cartridge filter elements 46 mounted thereon, with there being three groups of such elements stackingly arranged on each of the perforated pipes in the illustrated embodiment.

As is customary, the cartridge filter elements 46 are of cylindrical configuration with an axial bore 47 extending therethrough, and the perforated pipes 44 pass through those bores 47 of the filter elements. The cartridge filter elements 46 are pleated as is customary and are formed of a suitable fabric such as polyester, and the opposite ends are sealed by suitable ring shaped elements 48. A retainer plate 50 is mounted atop the plural stacks of filter elements and a suitable tie-down fastener rod and bolt arrangement 52 is employed to secure the retainer plate 50, and thus the cartridge filter elements 46 in place. This illustrated stacked array of cartridge filter elements 46, the perforated pipe 44 and the manifold means 32 are conventional elements commonly used in cartridge type filters and a thorough description of the operation thereof is deemed as being unnecessary in that it is well known in the art.

It will be understood that the illustrated and described filter 12 is intended to be typical of such filters and is not intended as a limitation of the present invention. For example, the manifold 32 is not necessarily as shown and described in all known cartridge type filters and the number and arrangement of the filter elements will vary from unit to unit.

The differences between the special filter 12 of the present invention and those which are well known in the art are the above described plural inlet ports 22 and 23 as opposed to a single inlet port being customary, the water flow deflector means 26 and 27, and a special drain outlet fitting 54 and drain pipe line 56. The purposes and advantages of the above stated differences will hereinafter be described in detail.

Reference is made once again to FIG. 1, and to FIG. 4, wherein the plumbing system and flow control valves are best seen. The water filtering system 10 includes a suitable pump 58 of the type normally used in filtering systems. The pump 58 is driven by a suitable electric motor 60 and has an inlet, or suction, port 62 and an outlet port 64. A strainer assembly 65 is located between the suction port 62 of the pump 58 and the pump itself as is customary.

The outlet port 64 of the pump 58 is coupled by a pipe line 66 to the inlet port 67 of a first motorized 3-port diverting valve 68. Such a valve is commercially available and is identified as an Ortega II motorized valve manufactured by Ortega Valve and Engineering Co., a division of Purex Pool Products, Inc., 14902 Moran Street, Westminster, Calif. 92683. The valve 68 has a first position wherein water supplied to the inlet port 67 will be directed to the first outlet port 69 thereof, and a second position wherein water is directed to the second outlet port 70. The first outlet port 69 of the valve 68 is coupled by a pipe line 72 to a tee-fitting 73 which divides the water supplied thereto between two pipe lines 74 and 75 with the pipe line 74 being connected to the inlet port 22 of the filter 12 and the pipe line 75 being connected to the inlet port 23 of the filter.

The second outlet port 70 of the valve 68 is connected by a pipe line 76 to a first port 78 of a second motorized 3-port diverting valve 80. This second valve 80 is of the same type as the above described valve 68 and therefore has a first position wherein its second and third ports 81 and 82, respectively, are internally connected to each other and a second position wherein its first port 78 is connected to its second port 81. The second port 81 of the motorized valve 80 is connected by the pipe line 38 to the manifold 32 (FIG. 2) of the filter 12, and the third port 82 of the valve 80 has a water return pipe line 84 connected thereto as will hereinafter be described.

The special drain pipe line 56, which was hereinbefore described as being a modification provided on the filter 12, has a third motorized diverting valve 86 therein. This motorized valve 86 is available from the above mentioned source and differs from the previously described valve 68 and 80 in that this valve 86 is a two port valve rather than a three port valve. Thus, the third motorized valve 86 has a first position wherein it closes the drain line 56 and a second position wherein it opens the drain line.

The suction port 62 of the pump 58 is shown as being coupled by a supply pipe line 88 to a first port 89 of a fourth motorized 3-port diverting valve 90. This fourth motorized valve 90 is the same type of valve as the hereinbefore described valves 68 and 80, and therefore has a first position wherein the first port 89 is internally connected to its second port 91 and a second position wherein its first port 89 is internally connected to its third port 92. The second port 91 of the valve 90 is coupled by a pipe line 94 to an outlet 95 of the first cooling tower 14 and the port 92 is similarly coupled by a pipe line 96 to the outlet 97 of the second cooling tower 16.

The hereinbefore mentioned water return pipe line 84 is connected to the first port 98 of a fifth motorized 3-port diverting valve 100 which is the same type of valve as the previously described valves 68, 80 and 90. The fifth motorized valve has a first position wherein its first port 98 is internally connected to its second port 101 and a second position wherein its first port is similarly connected to its third port 102. The second port 101 of the valve 100 is connected by a pipe line 103 to the inlet 104 of the first cooling tower 14 and the third port 102 is similarly connected by a pipe line 105 to the inlet 106 of the second cooling tower 16.

From the above, it will be apparent that the fourth and fifth valves 90 and 100 are water source switching valves which allow the water filtering system 10 of the present invention to selectively filter the water from either of the two sources, e.g. the first cooling tower 14 or the second cooling tower 16. It is to be understood that the source switching valves 90 and 100 are optional in that the water filtering system 10 can be used in conjunction with a single source or, by adding more valves, with a multiplicity of sources.

The following description of the operation of the water filtering system 10 will be broken down into two parts with the first being a water filtering operational mode, and the second being a two stage filter cleaning operation mode.

Filtering Operation Mode

In the filtering mode, the pump 58 supplies water under pressure to the first motorized valve 68 which is in its first position so that the water is supplied to the inlet ports 22 and 23 of the filter 12. The water entering the internal chamber 20 of the filter tank 18 is deflected into the circular and into a fanned-out flow pattern, as hereinbefore described, and will therefore flow evenly through each of the cartridge filter elements 46. After entering the filter elements, the water flows into the perforated pipes 44 and into the manifold 32. The filtered water exits the manifold 32 via the pipe line 38 and flows through the second valve 80 which is in its first position so that the filtered water is directed to the return pipe line 84. It will be understood that during this filtering mode, the third valve 86 is in its first position so that the drain line 56 is closed. Therefore, the filtered water will be returned to the cooling tower.

Filter Cleaning Operational Mode

As hereinbefore mentioned, the filter cleaning mode is a two stage operation which will now be described in its two separate stages. The first state is hereinafter referred to as a flushing stage with the second being a backwashing stage.

The water filtering system 10 can be manually switched, but is preferably automatically switched from its filtering mode to the filter cleaning mode at timed intervals, or whenever a pre-determined backpressure value is exceeded the filter elements will as hereinafter be described.

In the flushing mode the second valve 80 is moved to its second position which closes the water return pipe line 84, and the third valve 86 is moved to its second position which opens the drain line 56. Therefore, when in the flushing mode, water from the pump 58 will flow through the first valve 68 to the inlets 22 and 23 of the filter tank 18. In that the return line 84 is closed, the water entering the internal chamber 20 of the filter tank 18 will flush contaminants from the exterior surfaces of the cartridge filter elements 46 and direct those contaminants, along with any settled solids in the bottom of the tank 18, into the drain line 56 where they are directed to a suitable disposal point (not shown). When this flushing stage has been allowed to continue for a pre-determined time, as will hereinafter be described, the system 10 will be automatically switched to the backwash stage.

In the backwashing operational mode, the first valve 68 is moved to its second position and the second valve 80 is similarly switched to its second position, if it is not already in its second position as a result of the above described flushing operation. When so positioned, water under pressure from the pump 58 will flow through the first and second valve 68 and 80 to the pipe line 38 and thus into the manifold 32 (FIG. 2) provided in the bottom of the tank 18. Water from the manifold 32 will flow upwardly into the perforated pipes 44 and will flow through the filter cartridge elements 46 in a backwash direction, e.g. a direction is opposite to the normal flow therethrough in the filtering mode. As the water emerges from the peripheral surfaces of the filter elements 46 it, along with dislodged contaminants, will enter into the internal chamber 20 of the filter tank 18 and will exit therefrom through the drain outlet fitting 54, drain line 56 and the open valve 86.

As seen best in FIG. 1, each of the valves 68, 80 and 86, and the valves 90 and 100 if the system 10 is configured with a source switching capability, is provide with a handle 108 on its valve body. As is well known with regard to such valves, the handles 108 provide two functions. The first is that the handle will provide a visual indication of valve positioning and thus the flow through the valve. The second function of the handle 108 is that they permit the valves to be manually operated.

Therefore, the above described filter cleaning operational mode may be accomplished manually if desired. However, it is preferred that the cleaning mode be accomplished automatically at timed intervals, as will hereinafter be described in detail. Regardless of whether the filter cleaning operational mode is accomplished manually or automatically, it is preferred that the above described flushing stage and backwash be accomplished alternately and repeatedly during each filter cleaning operational cycle, and the following detailed description of an automatic filter control circuit 110 provides the filtering system 10 with such a capability. The reason for the preferred alternate and repeated switching back and forth between the flushing and backwash modes is that it causes a working movement of the filter elements 46 which may be described as a flexing movement. Such flexing movement of the filter elements 46 will augment the water flow to insure a complete and thorough dislodgement and flushing away of contaminants.

Reference is now made to FIG. 5 wherein the filter control circuit 110 is shown schematically. A source of electrical power, such as 110 V.A.C., is supplied to the circuit 110 by suitable conductors 112 and 113 and that power is simultaneously applied to a timer 114 and to three power transformers T1 T2 T3.

That power is also simultaneously supplied to a pressure operated switch 116 as will hereinafter be described.

The timer 114, which can be a clock operated switching device of a well known type or any functional equivalent, is normally open and will periodically close its switch 118 at adjustably pre-determined time intervals. During the water filtering operational mode of the filtering system 10, the timer 114 is in its normal position, e.g. the switch 118 is open.

Low voltage output from transformer T1 is supplied by a conductor 120 to contacts 121 and 122 of a first relay R1, low voltage from the transformer T2 is supplied by a conductor 124 to contacts 125 and 126 of a second relay R2, and low voltage from the transformer T3 is similarly directed by a conductor 128 to contacts 129 and 130 of a third relay R3. When in the filtering operational mode, e.g. the timer switch 118 is open, the first relay R1 is in a first, or normal, position wherein it relays the low voltage to a conductor 132 which is coupled to a first terminal 133 of a motor M1, the second relay R2 is in its first position where in it relays low voltage via a conductor 134 to first terminal 136 of a motor M2, and the third relay R3 is in its first position wherein it relays low voltage via a conductor 138 to a first terminal 139 of a third motor M3.

The first motor M1 is the motor associated with the first motorized valve 68 and when low voltage is applied to the terminal 133 thereof, the valve 68 will be driven to and will remain in its first position which is its proper position during the filtering operational mode and the flushing stage of the filter cleaning operational mode of the systems 10. motor M2 is the motor associated with the second motorized valve 80 and when low voltage is applied to its first terminal 136, the valve 80 will be driven to and will remain in its first position which is its proper position for the filtering operational mode of the system 10. The third motor M3 is associated with the third valve 86 and when low voltage is applied to its first terminal 139, the valve 86 will be driven to and will remain in its first position wherein it closes the drain pipe line 56 during the filtering operational mode of the system 10.

When the timer 114 closes the switch 118 to initiate a filter cleaning operational mode, supply voltage is applied by a conductor 140 to a power relay 142. The power relay is a normally open latching relay having an adjustable delay circuit 143 associated therewith. The conductor 140 will simultaneously apply supply voltage through the adjustable delay circuit 143 to the coil 144 of the relay and to a contact 145 thereof. This will energize the power relay so that the voltage on its contact 145 will be coupled to a contact 146 thereof. The relay 142 will remain in its energized state for a pre-determined time as determined by the preadjusted setting of the delay circuit 143.

As a result of storms, times of low relative humidity when water evaporates faster than usual, and the like, the water being filtered by the apparatus 10 can become contaminated more rapidly than usual. If this should happen, the filter 12 can become excessively dirty prior to the time when the apparatus will be switched by the timer 114 into the filter cleaning operational mode. To handle such situations, the apparatus 10 is provided with the hereinbefore mentioned pressure switch 116. As seen in FIGS. 1 and 4, the pressure switch 116 is mounted on top of the filter 12 and will therefore sense the internal pressure of the filter tank 18. The pressure switch 116 is normally open and will close in response to pressures in the filter 12 above a pre-determined value. As seen in FIG. 5, the pressure switch 116 is connected between the power supply conductor 112 and the output conductor 140 from the timer 114 to the power relay 142, and is therefore in parallel with the timer 114. In this manner, the filtering apparatus 10 can be switched into its filter cleaning operational mode either at pre-determined time intervals or when conditions within the filter 12 are such that filter cleaning should be accomplished in between the timed intervals.

In either case, when supply voltage is present on the contact 146 of the power relay 142, it will be coupled by a conductor 148 to the coil 150 of the third relay R3 and will energize that relay to its second position. In the second position of the relay R3, the low voltage circuit to the terminal 139 of the motor M3 will be opened and the low voltage present on the contact 130 of the relay will be internally coupled by the relay to the contact 152 thereof. The low voltage present on the contact 152 of the relay R3 is coupled by a conductor 154 to a second terminal 156 of the motor M3 and will operate the motor M3 so that it drives the valve 86 to its second position wherein the drain pipe line 56 is opened.

The supply voltage which is coupled by the conductor 148 to the relay R3, is simultaneously coupled by a conductor 158 to the coil 160 of the second relay R2 and will energize that relay R2 to its second position. In the second position of the relay R2, the low voltage circuit to terminal 136 of the motor M2 is opened and the low voltage present on the contact 126 of the relay R2 will be coupled to the contact 162 thereof. The low voltage on the contact 162 of the relay R2 is coupled by a conductor 164 to a second terminal 166 of the motor M2 and will operate that motor to drive the value 80 to its second position wherein the water return pipe line 84 from the filtering system 10 to the cooling tower or towers is closed.

The supply voltage which is directed to the coils 150 and 160 of the relays R3 and R2, respectively, is simultaneously coupled by a conductor 167 to a fourth relay R4 and by a conductor 168 to a fifth relay R5.

The fourth and fifth relays R4 and R5 in conjunction with a pair of delay timing devices TD-I and TD-II, interact to switch the filtering system 10 between its flushing stage and its backwash stage in a timed cycle when the filtering cleaning operational mode is initiated by the timer 114.

The relay R4 has the usual coil 170 and is shown in its normally closed de-energized state wherein its first and second contacts 172 and 174, respectively, are electrically interconnected. The relay R5 has the usual coil 176 and is shown in its normally open de-energized state wherein its first and second contacts 178 and 180, respectively, are open, or electrically disconnected from each other.

The delay timing device TD-I is a "delay on make" device, e.g. it is normally open and starts an adjustably pre-determined delay period when voltage is applied to its first terminal 182. When the delay period is completed, the device TD-1 will close and when closed will internally couple the voltage applied to its first terminal 182 to its second terminal 184. The device TD-I will remain closed, subsequent to completion of its adjustable delay period, until such time as the voltage is removed from its first terminal 182 which resets the device and readies it for the next application of voltage to its first terminal 182.

The delay timing device TD-II is a "delay on break" device which in normally closed and will internally couple an initially applied voltage on its first terminal 186 to a second terminal 188 thereof. When the initially applied voltage is removed from the first terminal 186 of the device TD-II, it will open and start an adjustable pre-determined delay time running. The device TD-II will remain open during the delay period regardless of the presence or absence of voltage on its first terminal 186. When the delay period is completed, the device TD-II will return to its closed state and will remain conductive until such time as the voltage is removed once again from its first terminal.

The delay timers TD-I and TD-II are commercially available from the Motors and Armatures, Inc. Company, P.O. Box 255, Hauppauge, N.Y. 11788. The delay timers are marketed under the name Mars, with TD-I being identified as part number 685744-32391, and TD-II being identified as part number 685744-32392.

The second contact 174 of the relay R4 is connected by a conductor 190 to the first terminal 186 of the delay device TD-II, and the second contact 180 of the relay R5 is similarly connected to the first terminal 182 of the delay device TD-I by a conductor 192. The second, or output, terminal 184 of the delay device TD-I is connected by a conductor 194 to the coil 170 of the relay R4. The second, or output, terminal 188 of the delay device TD-II is similarly coupled by a conductor 196 to the coil 176 of the relay R5 and is also coupled by another conductor 198 the coil 200 of the hereinbefore mentioned first relay R1.

When voltage is applied by the conductor 198 to the coil 200 of the relay R1, that relay will become energized to its second state. In the second state of the relay R1, the low voltage circuit to the terminal 133 of the motor M1 will be opened and the low voltage from the relay contact 122 will be electrically coupled to a contact 202 of the relay R1. The low voltage coupled to the contact 202 of the relay R1 is applied to a second terminal 204 of the motor M1 by a suitable conductor 206. This will operate the motor M1 so as to drive the valve 68 to its second position which, as described above, is the proper position for the backwash stage of the filter cleaning operational mode.

In addition to FIG. 5 reference is also made to the timing diagram shown in FIG. 6, which will help clarify the following sequence of operation.

When the timer 114 closes to initiate a filter cleaning operational mode, supply voltage will simultaneously be applied via the conductors 167 and 168 to the relays R4 and R5, that instant in time is identified as $t_1$ is the timing diagram. At $t_1$ R4 is closed, TD-II is closed, R5 is open, TD-I is open and R1 is in its de-energized state. In that R5 is closed, voltage is applied to the first terminal 186 of TD-II and is internally coupled through TD-II to the second terminal 188 thereof. The supply voltage present on the second terminal of TD-II is simultaneously applied to the coils 176 and 200 of the relays R5 and R1 respectively. Due to propagation time those relays will react at a time shortly after $t_1$ and will react by energizing R5 to a closed state and will energize R1 to its second state. When R1 is energized in this manner it will operate the motor M1 to drive the valve 68 to its second position and thereby start the backwash stage of the filter cleaning operational mode as hereinbefore described. When R5 is energized, simultaneously with R1, supply voltage will be applied to the first terminal 182 of TD-I. As described above, TD-I is normally open and its delay period is started when voltage is applied to its first terminal 182. Thus, nothing further will occur at $t_1$ (and the propagation time immediately thereafter) and the filter system 10 will remain in the backwash stage for duration of the adjustable time delay of TD-I.

When TD-I closes at the end of its delay period, the events which occur at that time, are indicated at $t_2$, and subsequent propagation times, in FIG. 6. Upon closing of TD-I, supply voltage will be applied to the second terminal 184 thereof and that voltage is supplied by conductor 194 to the coil 170 of R4. Thus, R4 will be energized to its open state at a sleightly lagging propagation time subsequent to the closing of TD-I. When R4 is opened in this manner it will remove the voltage from the first terminal 186 of TD-II thus opening TD-II and starting its time delay period. By opening TD-II in this manner, the direct result is that R5 will be de-energized to its normally open state and R1 will be simultaneously de-energized to its first state. When R5 is de-energized, it will remove the voltage from the first terminal 182 of TD-I thereby returning TD-I to its open state and resetting it for a subsequent application of voltage. When TD-I is opened as a result of the de-energization of R5, it will remove the voltage from the coil 170 of R4 thus closing R4 shortly after it was opened, but since TD-II is opened and its delay period is running, nothing will happen at this time as a result of the closing of R4. When TD-II opened shortly after $t_2$ is also removed the voltage from the coil 200 of R1 thus deenergizing R1 as mentioned above. The de-energization of R1 will drive the motor M1 to reposition the valve 68 and thereby start the flushing stage of the filter cleaning operational mode, and the filter system 10 will remain in the flushing stage for the duration of the adjustable time delay of TD-II.

When the delay period of TD-II is completed as indicated at $t_3$ in FIG. 6, it will close and thereby couple the voltage on its input terminal 186 to its output terminal 188, this will energize R5 to its second state. The energization of R5 will apply voltage to TD-I and starts its delay period running and the energization of R1 changes the filter system 10 back to its backwashing stage where it will remain during the time delay period before TD-I closes.

Upon examination of the timing diagram of FIG. 6, it will be seen that $t_3$ is identical to $t_1$ and $t_2$ is identical to $t_4$. Thus, the above described timing sequence will continue to cycle itself to switch the relay R1 between its first and second states as long as the timer 114, or the pressure switch 116 is closed so as to apply supply voltage to the relays R4 and R5, and thus the system 10 will be switched between the flushing and backwashing stages of its filter cleaning operational mode.

When the timer 114 opens, relay R1 will be de-energized, if not already in that state, and the relays R2 and R3 will also be de-energized so that the filter system 10 will be returned to its operational mode.

As hereinbefore mentioned, the water filtering system 10 of the present invention may be suitably coupled to a single source of water, and may optionally be coupled so as to filter the water in two or more sources. For illustrative and descriptive purposes, FIGS. 1 and 4 show the apparatus 10 as being coupled in the manner hereinbefore fully described to a pair of water sources, such as the illustrated cooling towers 14 and 16. In that the fourth and fifth motorized 3-port diverting valves 90 and 100 are employed as water source switching valves, an electric source switching circuit is provided for controlling the functions of those two valves, and the circuit is identified generally by the reference numeral 210.

As seen in FIG. 5, the source switching circuit 210 is connected to the previously discussed source of electric power by means of a suitable conductor 212. The supply voltage is coupled to a suitable timing device 214 by a conductor 215 and simultaneously to two step-down transformers T4 and T5.

The low voltage output of the transformer T4 is connected by a suitable conductor 216 to first and second contacts 217 and 218 of a relay R6, and the low voltage output of the transformer T5 is similarly coupled by a conductor 220 to the first and second contacts 221 and 222 of another relay R7.

The relay R6 is shown in its normal, or de-energized, state wherein the low voltage applied to its first contact 217 is electrically coupled by the relay to its third contact 224. The low voltage present on the third contact 224 of the relay R6 is connected by a conductor 226 to a first terminal 228 of a motor M4. When the relay R6 is energized, as will hereinafter be described, the low voltage present on its second contact 218 will be electrically coupled to a fourth contact 230 of the relay R6, and the circuit between the first and third contacts 217 and 224 will be opened. The low voltage present on the fourth contact 230 of the relay R6, when the relay is energized, is coupled by conductor 232 to a second terminal 234 of the motor M4.

The motor M4 is the motor associated with the fourth motorized valve 90 and when voltage is applied to the terminal 228 thereof, the valve 90 will be driven to a first position. The valve 90 will remain in its first position until such time as the low voltage is switched, by the relay R6, from the first terminal 228 to the second terminal 234 of the motor M4.

As was the case with the relay R6, the relay R7 is shown in its normal, or de-energized, state wherein the low voltage applied to its first contact 221 is electrically coupled by the relay to its third contact 236. The low voltage on the third contact 236 of the relay R7 is coupled by a conductor 238 to a first terminal 240 of a motor M5. When the relay R7 is energized, as will hereinafter be described, the low voltage on the second contact 242 of the relay R7, and the circuit between the first and third contacts 221 and 236 will be opened. The low voltage on the fourth contact 242 of the relay R7, when the relay is energized, is coupled by conductor 244 to a second terminal 246 of the motor M5.

The motor M5 is the motor associated with the fifth motorized valve 100 and when voltage is applied to the terminal 240 thereof, the valve will be driven to a first position thereof. The valve 100 will remain in its first position until such time as the low voltage is switched from the first terminal 240 to the second terminal 246 of the motor M5 by the relay R7.

The timing device 214, can be a well known clock operated switching device, or any functional equivalent, having two operating states, that is, its internal switch 248 is either open or closed. The timing device 214 will switch itself between the open and closed operating states thereof at adjustably pre-determined time intervals. When the timing device 214 is in the closed state, supply voltage applied to its internal switch 248 will be supplied by a conductor 250 through an on-off switch/indicator light circuit 252 to the coil 254 of the relay R6 and simultaneously to the coil 256 of the relay R7. Therefore, when the timing device 214 is open, both of the relays R6 and R7 will be in their de-energized states and when the timing device closes, those relays will be energized.

When the relays R6 and R7 are de-energized, low voltage will be coupled thereby to the first terminals 228 and 240, respectively, of the motors M4 and M5, and the associated valves 90 and 100 will be in their first positions. As hereinbefore described in detail, when the valves 90 and 100 are in their first positions, water form the first cooling tower 14 will be filtered by the filter system 10 of the present invention. Similarly, when the relays R6 and R7 are energized, both of the motors M4 and M5 will be operated to change their associated valves 90 and 100 to their second positions wherein water from the second cooling tower 16 will be filtered by the apparatus of the present invention.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A water filtering system for maximized extraction of contaminants from a highly contaminated water supply with minimal losses of water, said water filtering system comprising:
    (a) a water filter tank;
    (b) at least one cartridge filter element in said tank for maximized extraction of contaminants from the water to be filtered; and
    (c) plumbing system means connected to said tank and for connection to the water supply for providing a water filtering operational mode and an in situ filter cleaning operational mode with the filter cleaning operational mode being accomplished with minimal water losses, said plumbing system means including valve means having a first position wherein water is directed to said tank so as to flow in a filtering direction through said cartridge filter element and is received from said tank for returning to the water supply, said valve means having second and third positions to provide the in situ filter cleaning operational mode wherein the second position of said valve means provides a flushing stage of the filter cleaning mode in which water is directed from the water supply to said tank so as to flushingly impinge on said cartridge filter element and is received from said tank for disposal and wherein the third position of said valve means provides a backwash stage of the filter cleaning mode in which water is directed from the water supply to said tank so as to flow in a backwash direction through said cartridge filter element and is received from said tank for disposal.

2. A water filtering system as claimed in claim 1 and further comprising control means coupled to said valve means of said plumbing system means for periodically switching said water filtering system back and forth between its filtering mode and its filter cleaning mode and switching said valve means back and forth between its second and third positions during the filter cleaning mode.

3. A water filtering system as claimed in claim 1 and further comprising control means coupled to said valve means of said plumbing system means for switching back and forth between the filtering mode and the filter cleaning mode at adjustably pre-determined time intervals and switching said valve means back and forth between its second and third positions at adjustably pre-determined time intervals during the filter cleaning mode.

4. A water filtering system as claimed in claim 1 and further comprising:
    (a) a pressure sensing means associated with said tank for producing a signal when the pressure therein exceeds a pre-determined value; and
    (b) control means coupled to said valve means of said plumbing system means and coupled to said pressure sensing means for switching the water filtering system into its filter cleaning mode upon receipt of a signal from said pressure switching means, said control means including means for switching said valve means back and forth between the second and third positions thereof during the filter cleaning mode of the water filtering system.

5. A water filtering system as claimed in claim 1 and further comprising source switching means coupled to said plumbing system means and for coupling to at least two sources of water to be filtered thereto and for putting the sources of water in communication with said plumbing system means one at a time and periodically switching back and forth between the sources of water.

6. A water filtering system as claimed in claim 1 wherein said water filter tank further comprises:
   (a) a water inlet port means for receiving water from said plumbing system means during water filtering mode and the flushing stage of the filter cleaning mode of the water filtering system;
   (b) a drain port through which water is expelled from said filter tank during the flushing and backwash stages of the filter cleaning mode of the water filtering system; and
   (c) a water flow port for receiving water from said plumbing system means during the backwash stage of the filter cleaning mode and through which water is expelled from said filter tank during the water filtering mode of the water filtering system.

7. A water filtering system as claimed in claim 6 and further comprising deflector means in said filter tank proximate said water inlet port means for deflecting the water received thereby into a spread out substantially circular flow path in said filter tank.

8. A water filtering system as claimed in claim 6 wherein said water inlet port means includes at least a pair of inlet ports which are located at different locations between the top and bottom of said filter tank and on opposite sides thereof.

9. A water filtering system for use with highly contaminated water supplies for maximized filtration of contaminants and minimized water losses. said filtering system comprising:
   (a) a filter tank defining an internal chamber and having an inlet port means, a water flow port and a drain port;
   (b) at least one cartridge filter element in the chamber of said tank for maximized filtration of contaminants from the water to be filtered, said filter element having an interior which is in communication with the water flow port of said tank and having an exterior surface which is exposed to the chamber of said tank; and
   (c) plumbiing system means for connection to the water supply to be filtered and connected to the inlet port means, the water flow port and the drain port of said tank, said plumbing system means including valve means having a first position which provided the water filtering system with a water filtering operational mode wherein water from the water supply is directed to the inlet port means of said tank and is received from the flow port thereof and returned to the water supply, said valve means having second and third positions which provide the water filtering system with an in situ filter cleaning operational mode which is accomplished with minimized water losses, the second position of said valve means providing a flushing stage of the filter cleaning operational mode in which water from the water supply is directed to the inlet port means of said tank so as to flushingly impinge on the exterior surface of said filter element and is received from the drain port of said tank for disposal, and the third position of said valve means providing a backwash stage of the filter cleaning operational mode in which water from the water supply is directed to the flow port of said tank so as to flow from the interior to the exterior surface of said filter element and is received from the drain port of said tank for disposal.

10. A water filtering system as claimed in claim 9 and further comprising control means coupled to said plumbing system means for periodically switching the water filtering system back and forth between its filtering operational mode and its filter cleaning operational mode and alternately switching back and forth between the flushing stage and the backwash stage of the filter cleaning operational mode when the water filtering system is in its filter cleaning operational mode.

11. A water filtering system as claimed in claim 9 and further comprising control means coupled to said plumbing system means for automatically switching the water filtering system back and between its filtering operational mode at adjustably pre-determined time intervals and alternately switching back and forth between the flushing stage and the backwash stage of the filter cleaning operational mode at adjustably pre-determined time intervals when the water filtering system is in its filter cleaning operational mode.

12. A water filtering system as claimed in claim 9 and further comprising:
   (a) pressure sensing means associated with said filter tank for sensing the pressure therein and producing a signal when the pressure in said filter tank exceeds a pre-determined value; and
   (b) control means coupled to receive the signal from said pressure sensing means and coupled to said plumbing system means for switching the water filtering system from its filtering operational mode to its filter cleaning operational mode upon receipt of the signal from said pressure sensing means, said control means including means for alternately switching back and forth between the flushing stage and the backwash stage of the filter cleaning operational mode when the water filtering system is in its filter cleaning operational mode.

13. A water filtering system as claimed in claim 9 wherein said plumbing system means comprises:
   (a) a pump having an inlet port for connection to the source of water to be filtered and having an outlet port;
   (b) a first valve having a first port coupled to the outlet port of said pump, a second port coupled to the inlet port means of said filter tank and a third port, said first valve having a first position wherein the first and second ports thereof are in communication with each other and a second position wherein the first and third ports thereof are in communication with each other;
   (c) a second valve having a first port coupled to the third port of said first valve, a second port coupled to the water flow port of said filter tank and a third port for connection to the source of water for returning filtered water thereto, said second valve having a first position wherein the second and third ports thereof are in communication with each other and a second position wherein the first and second ports thereof are in communication with each other; and
   (d) a third valve having a first port coupled to the drain port of said filter tank and having a second port for draining of said filter tank, said third valve having a first position wherein the first and second ports thereof are out of communication with each other and a second position wherein the first and second ports are in communication with each other.

14. A water filtering system as claimed in claim 13 wherein said first, said second and said third valves are electrically operated motorized valves.

15. A water filtering system as claimed in claim 14 and further comprising:
   (a) an electric control circuit means coupled to the motors of said first valve, said second valve and said third valve for controlling the positioning thereof.
   (b) first timing means having open and closed states and associated with said control circuit means, said first timing means being in its open state for a pre-determined length of time wherein said first valve, said second valve and said third valve are in their first positions to provide the water filtering operational mode and being in its closed state for a pre-determined time to provide the filter cleaning operational mode wherein said second and said third valves are moved to their second positions; and
   (c) second timing means coupled to said first timing means for switching back and forth between first and second states during the time when said first timing means is in its closed state, said second timing means being associated with said control circuit means for positioning said first valve in its first position during the time when said second timing means is in its first state and positioning said first valve in its second position during the time when said second timing means is in its second state.

16. A water filtering system as claimed in claim 15 wherein said first timing means is adjustable for setting the times when it is in its open and closed states.

17. A water filtering system as claimed in claim 15 wherein said second timing means is adjustable for setting the length of time when it is in its first state and for setting the length of time when it is in its second state.

18. A water filtering system as claimed in claim 15 and further comprising a normally open pressure operated switch coupled to said filter tank for sensing the internal pressure thereof and closing when the sensed pressure exceeds a pre-determined value, said pressure switch being coupled to said control circuit means to override said first timing means by switching the water filtering system into its filter cleaning operational mode whenever the sensed pressure exceeds the pre-determined value and returning the water filtering system to its water filtering operational mode when the sensed pressure drops below a pre-determined valve.

19. A water filtering system as claimed in claim 13 wherein said plumbing system means further comprises:
   (a) a fourth valve having a first port coupled to the inlet port of said pump for supplying water to be filtered thereto, said fourth valve having a second port for coupling to a first source of water to be filtered and having a third port for coupling to a second source of water to be filtered, said fourth valve having a first position wherein the first and second ports thereof are in communication with each other and having a second position wherein the first and third ports are in communication with each other;
   (b) a fifth valve having a first port coupled to the third port of said second valve for receiving filtered water therefrom, said fifth valve having a second port for coupling to the first source of water and having a third port for coupling to the second source of water to be filtered, said fifth valve having a first position wherein the first and second ports thereof are in communication with each other and a second position wherein the first and third ports are in communication with each other; and
   (c) source switching means coupled to said fourth and said fifth valves for periodically and simultaneously switching said fourth and said fifth valves back and forth between their first and second positions.

20. A water filtering system as claimed in claim 19 wherein said fourth and said fifth valves are electrically operated motorized valves.

21. A water filtering system as claimed in claim 20 wherein said source switching means is an electric circuit which is coupled to the motors of said fourth and said fifth valves for controlling the positioning thereof, said electric circuit including a timing means having open and closed states and being switchable back and forth between those states. Said timing means being in its open state for a pre-determined length of time wherein said forth and said fifth valve are in their first position and being in its closed state for a pre-determined length of time wherein said fourth and said fifth valves are in their second positions.

22. A water filtering system as claimed in claim 21 wherein said timing means of said source switching means is adjustable for setting the length of time that it is in the open state and the length of time that it is in the closed state.

23. A water filtering system as claimed in claim 9 wherein said inlet port means of said filter tank includes at least a pair of inlet ports located at different locations between the top and bottom of said filter tank and disposed on opposite sides thereof.

24. A water filtering system as claimed in claim 23 and further comprising a pair of deflector means mounted in said filter tank and each associated with a different one of said pair of inlet ports for deflecting the water directed thereto by said plumbing system means into a spread-out substantially circular flow path in the internal chamber defined by said filter tank.

* * * * *